United States Patent Office 3,429,776
Patented Feb. 25, 1969

3,429,776
PROCESS FOR THE PRODUCTION OF GLUTAMIC ACID
Robert H. Newell, Terre Haute, Ind., assignor to Commercial Solvents Corporation, New York, N.Y., a corporation of Maryland
No Drawing. Filed Jan. 3, 1966, Ser. No. 518,035
U.S. Cl. 195—29    2 Claims
Int. Cl. C12d *13/06;* C07c *99/00*

ABSTRACT OF THE DISCLOSURE

An improved proces for the production of glutamic acid by the cultivation of *Brevibacterium divaricatum* in a fermentation medium wherein the pH of the medium is adjusted to 9.0–9.8 with ammonia prior to inoculation.

---

This invention generally relates to a process for the production of glutamic acid by fermentation. In a particular aspect it relates to an improved nutrient medium for production of glutamic acid by fermentation.

Glutamic acid is produced in high yields by the fermentation of nutrient media with certain glutamic acid-producing strains of microorganisms. Many suitable microorganisms are described in the prior art. A satisfactory method for the production of glutamic acid is described in U.S. Patent No. 2,978,383 and U.S. Patent No. 2,978,384, both issued on Apr. 4, 1961, to Koichi Yamada. This method utilizes an aqueous nutrient fermentation medium comprising a carbohydrate source, a nitrogen source, a phosphate source, a potassium source, and trace amounts of mineral salts. It has also been found advantageous to provide a growth factor, such as biotin or oleic acid as disclosed in Canadian patent application Ser. No. 845,789 and U.S. 3,156,627, to provide for satisfactory growth of the organism.

According to the Yamada process, the fermentation medium is adjusted to a pH of from about 8.0 to about 8.2, followed by cultivating a glutamic acid-producing strain of the microorganism, *Brevibacterium divaricatum*, in the medium. The fermentation is preferably carried out at temperatures ranging from about 30 to about 40° C. at pH ranging from about 6 to about 9 under submerged conditions of agitation and aeration.

Although the Yamada process gives satisfactory results, the yield of glutamic acid based on the conversion of carbohydrate to glutamic acid is less than that theoretically possible. Furthermore, there was a natural limitation on the amount of carbohydrate which the organism could convert to glutamic acid, so that if any additional carbohydrate was present it was simply consumed by the organism without conversion to glutamic acid. If improved conversion of carbohydrate to glutamic acid could be attained, greater production could be realized at no increase in costs. If greater quantities of carbohydrate could be utilized by the organism without a decline in conversion to glutamic acid, still greater production capacity per fermentor could be achieved.

It is an object of this invention to provide a new process for the production of glutamic acid.

It is another object of this invention to provide an improved nutrient medium for the production of glutamic acid by fermentation.

Other objects of this invention will become apparent to those skilled in the art from the description herein.

An improved process has been discovered for the production of glutamic acid by the cultivation of a glutamic acid-producing microorganism in a fermentation medium. In the improved process, the pH of the fermentation medium is adjusted to a pH within the range of from 9.0 to about 9.8 instead of to a pH within the range of from about 8.0 to 8.2 as in the prior process. The medium is then inoculated with the glutamic acid-producing microorganism. During the fermentation, carbohydrate is incrementally fed to the fermentor as is known in order to replace the carbohydrate utilized by the organism. In general, the fermentation is conducted by known procedures, e.g. by the method of Yamada.

The step of adjusting the medium to an elevated pH results in improved conversion of the carbohydrate to glutamic acid. In addition, this step makes it possible to incrementally feed larger quantities of carbohydrate during the fermentation than has heretofore been possible without causing a decline in conversion. Therefore, the fermentation medium resulting from the adjustment of the pH is an improvement over the medium used in the previous process.

This is a surprising result since it was not previously suspected that treatment of the fermentation medium to a high pH would have a beneficial effect on the production of glutamic acid. It is known that at alkalinities above pH 9 microorganisms do not in general grow satisfactorily, so an elevated pH at the start of the fermentation would previously have been regarded as adverse.

In the practice of this invention, about 14,000 gallons of fermentation medium is prepared as given in detail in Example 1. Approximately 9,000 to 10,000 lbs, of carbohydrate is used in preparing the medium in both the process of this invention and in the prior process. Higher starting amounts can be employed, but the possibility of unsatisfactory fermentations is increased. Unsatisfactory fermentations are those resulting in poor conversions of carbohydrate to glutamic acid. The fermentation medium is transferred to a fermentor equipped with an air inlet at the bottom of the fermentor, an air outlet at the top, and an agitator. Air is sparged into the fermentation medium through the air inlet, the agitator is started, and the air outlet is adjusted to maintain a pressure of 10 p.s.i. in the fermentor. The pH is then adjusted to a pH within the range of 9.0 to about 9.8, preferably above 9.0, and still more preferably to within the range of from 9.1 to 9.4 with ammonia. At a pH within the range of from 9.1 to 9.4 substantially consistent good results have been obtained. Oleic acid and an inoculum of *Brevibacterium divaricatum*, or other glutamic acid-producing organism, from a seed tank are added to the fermentor. The oleic acid serves as a growth factor to promote the growth of the microorganism. The carbohydrate content is checked hourly by known methods of analysis and when the concentration falls to below about 3% by weight aditional carbohydrate is slowly added. Throughout the remainder of the fermentation, the carbohydrate content is checked hourly and maintained at about 1% to about 3% by incremental addition of carbohydrate. In general, the fermentation and recovery of glutamic acid is conducted by known procedures, e.g. according to the method of Yamada, and the temperature is maintained at from about 30° C. to about 38° C. during the fermentation.

The practice of this invention is further illustrated by the following examples:

Example I

Six batches of glutamic acid were produced by fermentation as follows:

A fermentation medium having the following composition was prepared:

| | | |
|---|---|---|
| Carbohydrate (glucose) | lbs. | 9,900 |
| Urea | lbs. | 230 |
| $KH_2PO_4$ | lbs. | 1.2 |
| $K_2SO_4$ | lbs. | 112 |
| $MgSO_4 \cdot 7H_2O$ | lbs. | 56 |
| $FeSO_4 \cdot 7H_2O$ | p.p.m. | 8 |
| $MnSO_4 \cdot 4H_2O$ | p.p.m. | 6 |
| $ZnSO_4$ | p.p.m. | 1.5 |
| $Al_2(SO_4)_3$ | p.p.m. | 0.5 |
| $CoSO_4$ | p.p.m. | 0.5 |
| $Na_2B_4O_7$ | p.p.m. | 1.5 |

Adjust pH to 5.9–6.1.
Tap water, quantity sufficient to make 14,000 gallons.

The medium was sterilized, cooled to about 32° C. and transferred to a 20,000 gallon fermentor. The pH of three of the batches was adjusted to 8.0 with ammonia according to the previous process, and the pH of the remaining three batches was adjusted with ammonia to 9.0, 9.2 and 9.6 respectively. Each fermentor was then inoculated with *Brevibacterium divaricatum*, 18 liters of oleic acid was added per fermentor, and the fermentation was conducted at a temperature of from about 30° C. to about 38° C. according to the method of Yamada.

Analyses were made hourly for pH, carbohydrate content, and glutamic acid content for the remainder of the fermentation. The carbohydrate content was maintained at a concentration of from about 1% to about 3% by weight by incremental addition of a glucose solution. Typically about 3,000 gallons of a solution containing about 8,800 lbs. of glucose is required to complete the fermentation, so that typically about 18,700 lbs. of carbohydrate is utilized and the final volume of the fermentor contents is about 17,000 gallons. The pH of the fermentor contents was maintained within the range from 6.0 to 9.0, preferably about 8.0 by the addition of anhydrous ammonia. When the hourly analyses indicated that glutamic acid production reached a maximum, the fermentation was adjudged complete. The glutamic acid was then harvested.

The results are given in Table 1. It was found that adjustment of the pH to within the range of from 9.0 to about 9.6 prior to inoculation resulted in an increase of about 10% in the production of glutamic acid compared with the glutamic acid produced when the pH is adjusted to about 8.0.

TABLE 1

| Batch No. | pH adjusted to— | Glutamic acid Assay, g./l. | Produced, lbs. per fermentor | Conversion of carbohydrate, percent |
|---|---|---|---|---|
| 1 | 8.0 | 47 | 6,534 | 35.1 |
| 2 | 8.0 | 47 | 6,729 | 36.1 |
| 3 | 8.0 | 46 | 6,777 | 36.4 |
| Average | | 46.8 | 6,722 | 36.1 |
| 4 | 9.0 | 54 | 7,440 | 39.9 |
| 5 | 9.2 | 50 | 7,366 | 39.5 |
| 6 | 9.6 | 53 | 7,588 | 40.7 |
| Average | | 52.3 | 7,465 | 40.0 |

Example 2

The experiment of Example 1 was repeated with seven batches except that the total carbohydrate content was increased to 20,618 lbs. (an increase of 10%+ over the previous example). The following results were obtained:

TABLE 2

| Batch No. | pH adjusted to— | Glutamic acid Assay, g./l. | Produced, lbs. per fermentor | Conversion of carbohydrate, percent |
|---|---|---|---|---|
| 7 | 8.0 | 44 | 6,008 | 29.2 |
| 8 | 8.0 | 49 | 7,003 | 34.1 |
| 9 | 8.0 | 48 | 6,554 | 31.9 |
| 10 | 8.0 | 46 | 6,529 | 31.8 |
| Average | | 46.8 | 6,524 | 31.8 |
| 11 | 9.0 | 59 | 8,374 | 40.7 |
| 12 | 9.0 | 59 | 8,129 | 39.6 |
| 13 | 9.0 | 56 | 8,176 | 39.8 |
| Average | | 58 | 8,226 | 40.0 |

In this experiment, when the medium was adjusted to only pH 8.0, the microorganism was not able to utilize the additional carbohydrate for glutamic acid production and conversion of carbohydrate averaged only 31.8% compared with 36.1% in Example 1. When the medium was adjusted to pH 9.0, however, the microorganism was able to utilize the additional carbohydrate for glutamic acid production. The same conversion was obtained as in Example 1 and 10% additionally greater production of glutamic acid per fermentor was achieved.

Example 3

The experiment of Example 2 is repeated except that the pH of three of the batches is adjusted to 9.8 instead of 9.0. The expected increased conversion of carbohydrate is obtained.

Example 4

In this example, the fermentation was conducted according to the general procedure of Example 1. The fermentation medium was prepared with 10,000 lbs. of glucose and the pH of the medium was adjusted to within the range of about 9.1 to about 9.4. During the fermentation, an additional quantity of 13,300 lbs. of glucose was incrementally fed to the fermentor, bringing the total amount of glucose to 23,300 lbs. at the higher conversion rate of about 40%. In the previous process of Example 1 about 18,700 lbs. of carbohydrate was used at a conversion rate of about 36%.

What is claimed is:

1. A process for the production of glutamic acid by fermentation wherein *Brevibacterium divaricatum* is cultivated in a fermentation medium, comprising treating said fermentation medium with ammonia to obtain a pH within the range of from 9.0 to about 9.8, inoculating said fermentation medium with said microorganism, adding oleic acid as a growth factor, cultivating said microorganism under glutamic acid-producing conditions and at a temeprature of from about 30 to about 38° C., and recovering glutamic acid therefrom.

2. The process of claim 1 wherein the pH is from about 9.1 to about 9.4.

References Cited

UNITED STATES PATENTS 2,978,383   4/1961   Yamada _____ 195—47

LIONEL M. SHAPIRO, *Primary Examiner.*

U.S. Cl. X.R.

195—47